(12) United States Patent
Bae

(10) Patent No.: US 10,454,306 B2
(45) Date of Patent: *Oct. 22, 2019

(54) WIRELESS POWER RECEIVER AND POWER CONTROL METHOD THEREOF

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,672

(22) Filed: Oct. 24, 2018

(65) Prior Publication Data

US 2019/0058356 A1    Feb. 21, 2019

Related U.S. Application Data

(63) Continuation of application No. 15/847,048, filed on Dec. 19, 2017, now Pat. No. 10,148,114, which is a
(Continued)

(30) Foreign Application Priority Data

Apr. 26, 2012    (KR) .................. 10-2012-0044148

(51) Int. Cl.
*H01M 10/44* (2006.01)
*H01M 10/46* (2006.01)
(Continued)

(52) U.S. Cl.
CPC .............. *H02J 50/10* (2016.02); *H02J 7/008* (2013.01); *H02J 7/025* (2013.01); *H02J 17/00* (2013.01);
(Continued)

(58) Field of Classification Search
CPC .. H02J 5/005; H02J 7/025; H02J 7/355; H02J 7/0042
(Continued)

(56) References Cited

U.S. PATENT DOCUMENTS 6,134,130 A    10/2000    Connell et al.
6,750,560 B1    6/2004    Nishimoto et al.
(Continued)

FOREIGN PATENT DOCUMENTS

| CN | 102299566 A | 12/2011 |
| JP | 2011-244531 A | 12/2011 |
| KR | 10-0736053 B1 | 7/2007 |
| KR | 10-2008-0005020 A | 1/2008 |
| KR | 10-0859445 B1 | 9/2008 |
| KR | 10-0903464 B1 | 6/2009 |

*Primary Examiner* — Edward Tso

(74) *Attorney, Agent, or Firm* — Birch, Stewart, Kolasch & Birch, LLP

(57) ABSTRACT

A method of supplying power in a wireless power receiver, can include receiving an AC power via a reception coil in the wireless power receiver; rectifying the AC power to a DC power; entering a charging mode by transferring the DC power to a load when a voltage of the DC power is equal to or greater than a first threshold voltage; maintaining the load in the charging mode when the voltage of the DC power is equal to or greater than a second threshold voltage in a state of the charging mode; and blocking the DC power to the load when the voltage of the DC power transitions from a voltage higher than the second threshold voltage to a lower voltage less than the second threshold voltage.

21 Claims, 5 Drawing Sheets

Related U.S. Application Data continuation of application No. 15/479,753, filed on Apr. 5, 2017, now Pat. No. 9,871,397, which is a continuation of application No. 14/397,102, filed as application No. PCT/KR2013/003654 on Apr. 26, 2013, now Pat. No. 9,647,480.

(51) Int. Cl.

| | | |
|---|---|---|
| *H02J 50/10* | (2016.01) | |
| *H02J 7/02* | (2016.01) | |
| *H02J 17/00* | (2006.01) | |
| *H02M 7/217* | (2006.01) | |
| *H02J 50/90* | (2016.01) | |
| *H02J 50/12* | (2016.01) | |
| *H02J 7/00* | (2006.01) | |

(52) U.S. Cl.
CPC .............. *H02J 50/12* (2016.02); *H02J 50/90* (2016.02); *H02M 7/2176* (2013.01)

(58) Field of Classification Search
USPC .................................. 320/107, 108; 307/104
See application file for complete search history.

(56) References Cited

U.S. PATENT DOCUMENTS

| | | |
|---|---|---|
| 8,338,991 B2 | 12/2012 | Von Novak et al. |
| 9,531,441 B2 | 12/2016 | Bae |
| 9,531,444 B2 | 12/2016 | Bae |
| 9,647,480 B2 | 5/2017 | Bae |
| 9,871,397 B2 | 1/2018 | Bae |
| 10,148,114 B2 * | 12/2018 | Bae .......................... H02J 7/025 |
| 2007/0103110 A1 | 5/2007 | Sagoo |
| 2010/0036773 A1 | 2/2010 | Bennett |
| 2010/0295506 A1 | 11/2010 | Ichikawa |
| 2011/0235380 A1 | 9/2011 | Tseng et al. |
| 2011/0241624 A1 | 10/2011 | Park et al. |
| 2012/0235636 A1 | 9/2012 | Partovi |
| 2013/0063085 A1 | 3/2013 | Takada et al. |
| 2013/0069446 A1 | 3/2013 | Bai et al. |
| 2014/0339912 A1 | 11/2014 | Haseno et al. |

FOREIGN PATENT DOCUMENTS

| | | |
|---|---|---|
| KR | 10-1065738 B1 | 9/2011 |
| KR | 10-2011-0109400 A | 10/2011 |
| KR | 10-2011-0134912 A | 12/2011 |
| WO | WO 2008/133388 A1 | 11/2008 |

* cited by examiner

[FIG.1]
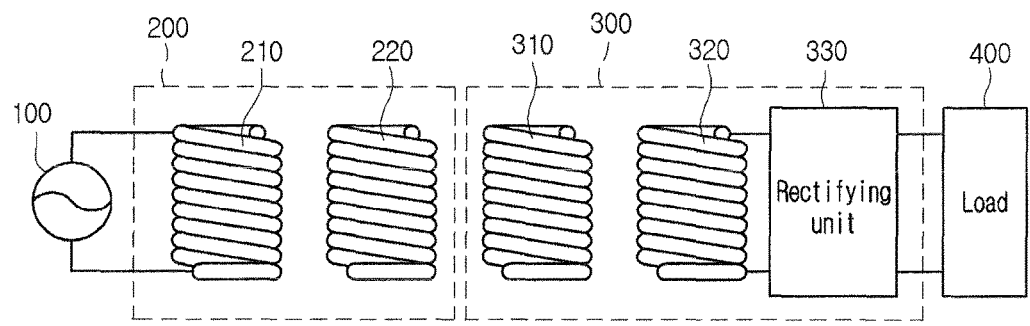
[FIG. 2]
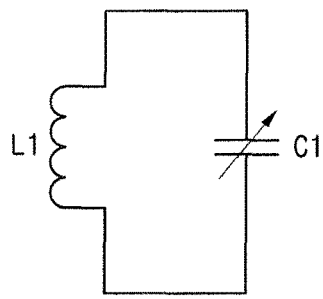
[FIG. 3]
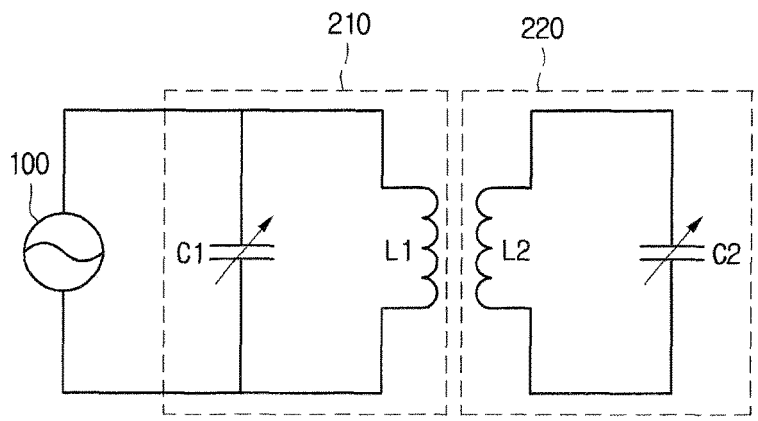

[FIG. 4]
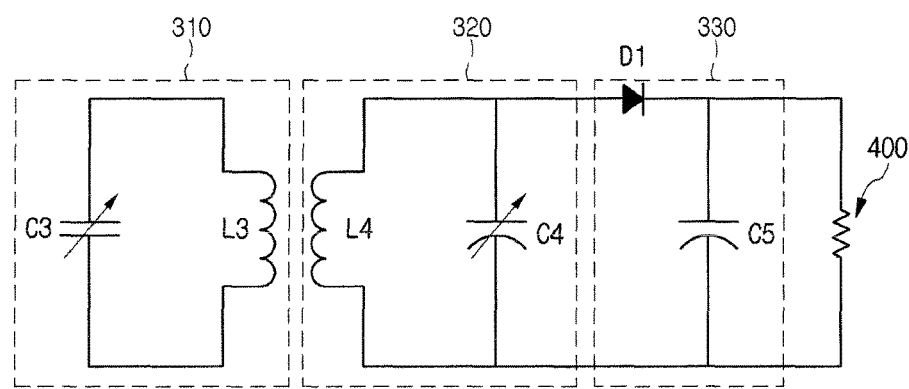
[FIG. 5]
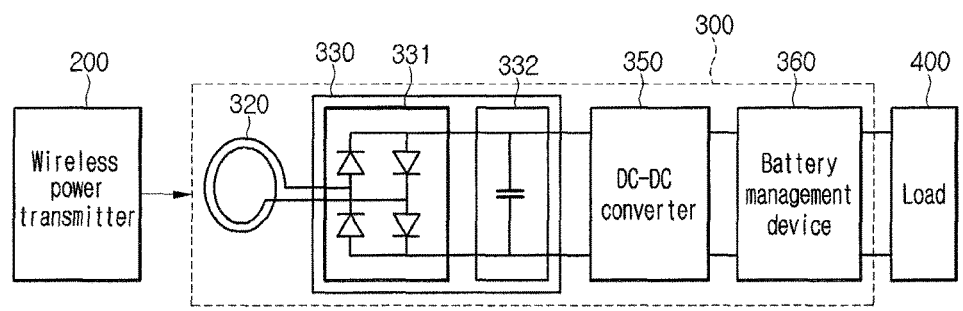

[FIG. 6]
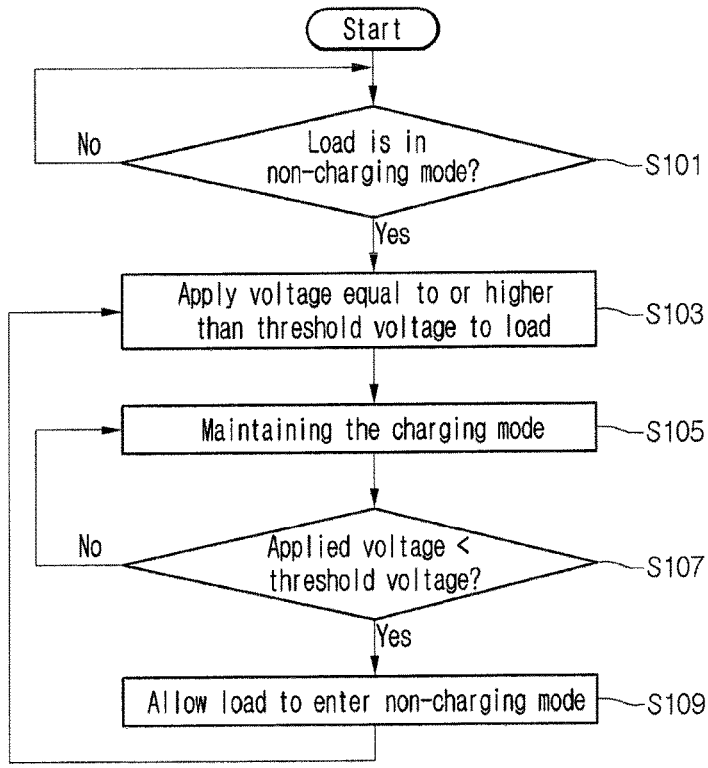
[FIG. 7]
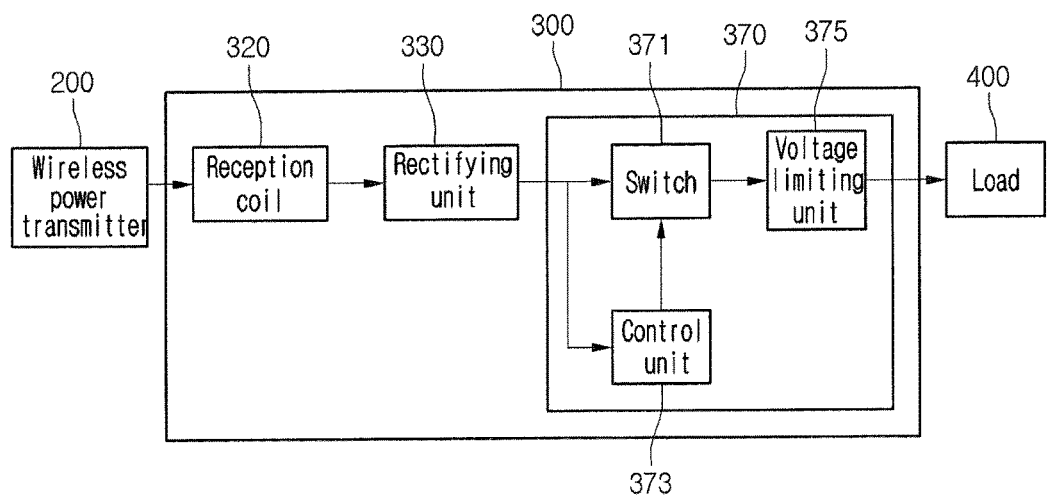

[FIG. 8]
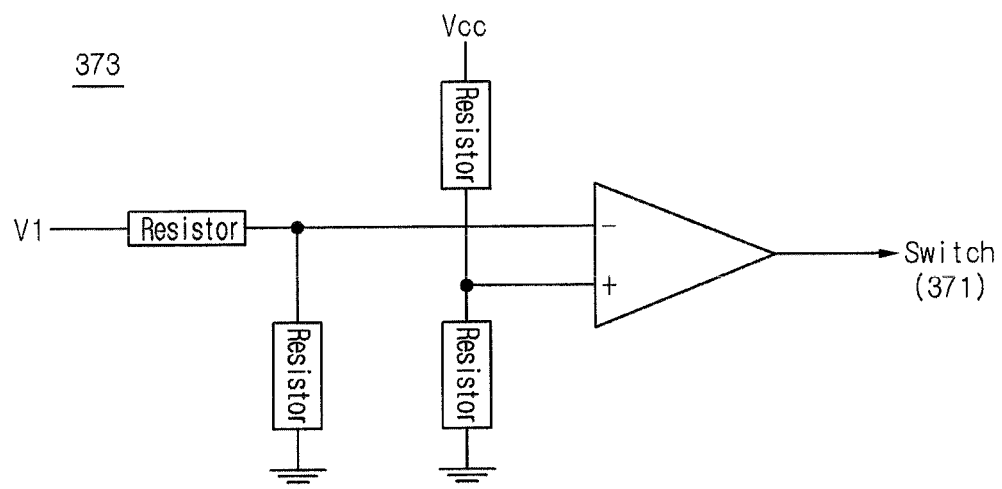
[FIG. 9]
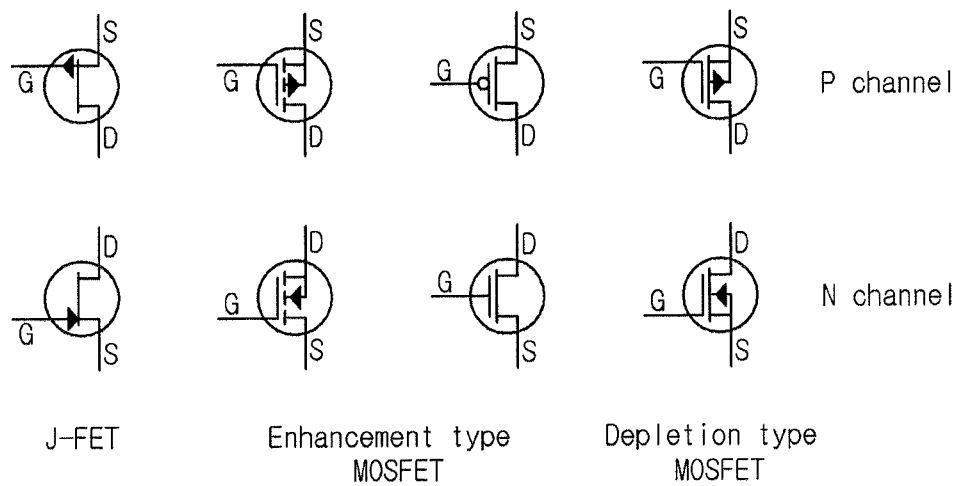
J-FET     Enhancement type MOSFET     Depletion type MOSFET

[FIG. 10]
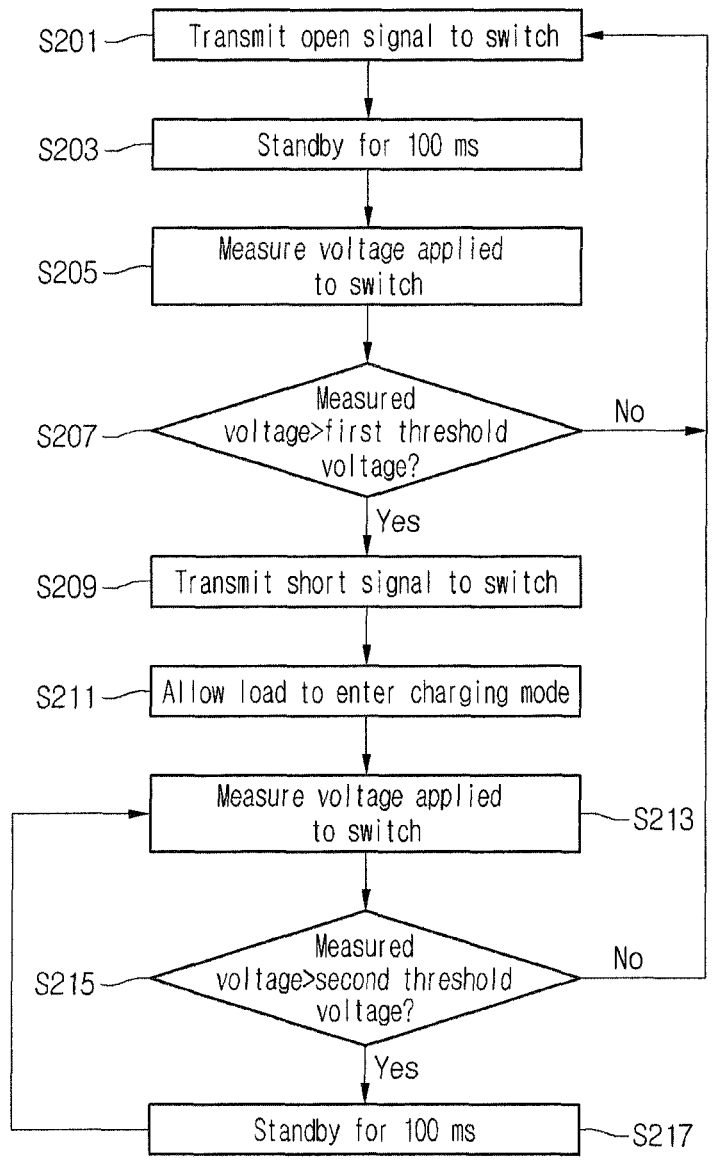

WIRELESS POWER RECEIVER AND POWER CONTROL METHOD THEREOF

CROSS-REFERENCE TO RELATED APPLICATIONS

This application is a Continuation of U.S. patent application Ser. No. 15/847,048 filed on Dec. 19, 2017, which is a Continuation of U.S. patent application Ser. No. 15/479,753 filed on Apr. 5, 2017 (now U.S. Pat. No. 9,871,397 issued on Jan. 1, 2018), which is a Continuation of U.S. patent application Ser. No. 14/397,102 filed on Oct. 24, 2014 (now U.S. Pat. No. 9,647,480 issued on May 9, 2017), which was filed as the National Phase of PCT International Application No. PCT/KR2013/003654 filed on Apr. 26, 2013, which claims the benefit of priority of Korean Patent Application No. 10-2012-0044148 filed on Apr. 26, 2012, all of which are hereby expressly incorporated by reference into the present application.

BACKGROUND OF THE INVENTION

The embodiment relates to a wireless power receiver and a power control method thereof. A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance is short.

Until now, wireless energy transmission schemes include a remote telecommunication technology based on resonance and a short wave radio frequency in addition to the electromagnetic induction.

Recently, among wireless power transmitting technologies, an energy transmitting scheme employing electromagnetic induction or resonance has been widely used.

In a wireless power transmission system employing electromagnetic induction or resonance, since an electrical signal generated between the wireless power transmitter and the wireless power receiver is wirelessly transferred through coils, a user may easily charge electronic appliances such as a portable device.

As electric and electronic technology has been advanced and a battery has been used in modern times, power supply is carried out by using a battery in a wireless power transmission system.

However, in the related art, as the voltage applied to a battery is changed, the charged state of the battery is unstable.

SUMMARY OF THE INVENTION

The embodiment provides a method of preventing a wireless power transmission system from being erroneously operated through a power control algorithm when power is wirelessly transmitted using electromagnetic induction or resonance.

The embodiment provides a method capable of greatly improving the power transmission efficiency of a wireless power transmission system through a power control algorithm when power is wirelessly transmitted using electromagnetic induction or resonance.

The embodiment provides a method capable of stably supplying power by improving a charged state of a battery through a power control algorithm when power is wirelessly transmitted using electromagnetic induction or resonance.

According to an embodiment, there is provided a wireless power receiver for transferring power received from a wireless power transmitter to a load, which includes a reception coil to receive AC power from the wireless power transmitter; a rectifying unit to rectify the received AC power into DC power; and a charging management unit to control DC power applied to the load by comparing the DC power with a threshold value.

The charging management unit may include a switch to enable the rectifying unit to be connected to or separated from and the load; and a control unit to control the DC power applied to the load by allowing the switch to be switched on or off according to a comparison result of the DC power with the threshold value.

The control unit may allow the load to enter the charging mode by allowing the switch to be switched on when the DC power is equal to or greater than a first threshold value.

The control unit may allow the switch to be switched off to block a supply of the power to the load when the DC power is less than the first threshold value.

The control unit may allow the switch to be switched off to block a supply of the power to the load when the DC power is less than a second threshold value, and the first threshold value is greater than the second threshold value.

The control unit may transfer the DC power to the load to maintain the load in the charging mode when the DC power is equal to or greater than a second threshold value in a state that the load enters the charging mode, and the first threshold value may be greater than the second threshold value.

The first threshold value may be a minimum value required for the load to enter the charging mode, and the second threshold value may be a minimum value required for the load to maintain the charging mode.

The charging management unit may measure the rectified DC power every a preset time while the load is maintained in the charging mode.

The charging management unit may compare a voltage output from the rectifying unit with a threshold voltage in order to compare the DC power with the threshold value.

The charging management unit may further include a voltage limiting unit to absorb power exceeding a preset value when the DC power transferred to the power is equal to or greater than the preset value.

The voltage limiting unit may include a zener diode.

The reception coil may include a reception resonant coil resonantly couple to a transmission resonant coil of the wireless power transmitter to receive the AC power; and a reception induction coil to receive the AC power from the reception resonant coil by using electromagnetic induction and to transfer the AC power to the rectifying unit.

The reception coil may receive the AC power from the wireless power transmitter by using electromagnetic induction.

The embodiments have the following effects.

The wireless power transmission system may be prevented from being out of order and may be stably operated through a power control algorithm when power is wirelessly transmitted by using electromagnetic induction or resonance.

The power transmission efficiency of the wireless power transmission system may be greatly improved through the power control algorithm.

In addition, the charged state of a battery is improved through the power control algorithm, so that it is possible to stably supply power.

Meanwhile, any other various effects will be directly and implicitly described below in the description of the embodiment.

BRIEF DESCRIPTION OF THE DRAWINGS

FIG. 1 is a diagram showing a configuration of a wireless power transmission system according to the embodiment.

FIG. 2 is an equivalent circuit diagram of a transmission induction coil according to one embodiment.

FIG. 3 is an equivalent circuit of a power source and a wireless power transmitter according to one embodiment.

FIG. 4 is an equivalent circuit of a wireless power receiver according to one embodiment.

FIG. 5 is a diagram showing a configuration of a resonant wireless power transmission system according to a second embodiment.

FIG. 6 is a flowchart illustrating a power control method of a wireless power receiver according to a first embodiment.

FIG. 7 is a block diagram showing a wireless power receiver according to a third embodiment.

FIG. 8 is a circuit diagram showing a configuration of a control unit according to one embodiment.

FIG. 9 is a view showing various configuration examples of a switch according to one embodiment.

FIG. 10 is a flowchart illustrating a power control method of a wireless power receiver according to a second embodiment.

DETAILED DESCRIPTION OF THE INVENTION

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, a light emitting device, a light emitting device package, a light unit and a method of manufacturing a light emitting device according to embodiments will be described with reference to accompanying drawings.

FIG. 1 a circuit diagram showing a resonance-type wireless power transmission system 1000 according to the embodiment.

Referring to FIG. 1, the wireless power transmission system 10 may include a power source 100, a wireless power transmitter 200, a wireless power receiver 300 and a load 400.

According to one embodiment, the power source 100 may be included in the wireless power transmitter 200.

The wireless power transmitter 200 may include a transmission induction coil 210 and a transmission resonant coil 220.

The wireless power receiver 300 may include a reception resonant coil 310, a reception induction coil 320, a rectifying unit 330 and the load 400.

Both terminals of the power source 100 are connected to both terminals of the transmission induction coil 210.

The transmission resonant coil 220 may be spaced apart from the transmission induction coil 210 by a predetermined distance.

The reception resonant coil 310 may be spaced apart from the reception induction coil 320 by a predetermined distance.

Both terminals of the reception induction coil 320 are connected to both terminals of the rectifying unit 330, and the load 400 is connected to both terminals of the rectifying unit 330. According to one embodiment, the load 400 may be included in the wireless power receiver 300.

The power generated from the power source 100 is transmitted to the wireless power transmitter 200. The power received in the wireless power transmitter 200 is transmitted to the wireless power receiver 300 that makes resonance with the wireless power transmitter 200 due to a resonance phenomenon, that is, has the resonance frequency the same as that of the wireless power transmitter 200.

Hereinafter, the power transmission process will be described in more detail.

The power source 100 may be an AC power source for providing AC power having a predetermined frequency.

AC current flows through the transmission induction coil 210 by the power supplied from the power source and the transmission resonant coil 220 are inductively coupled with each other. When the AC current flows through the transmission induction coil 210, the AC current is induced to the transmission resonant coil 220 physically spaced apart from the transmission induction coil 210 due to the electromagnetic induction. Thereafter, the power transferred to the transmission resonant coil 220 is transmitted to the wireless power receiver 300, which makes a resonance circuit with the wireless power transmitter 200, through resonance.

Power may be transmitted between two LC circuits, which are impedance-matched with each other, through resonance. The power transmitted through the resonance may be farther transmitted with higher efficiency when comparing with the power transmitted by the electromagnetic induction.

The reception resonant coil 310 receives power from the transmission resonant coil 220 through the resonance. The AC current flows through the reception resonant coil 310 due to the received power. The power transferred to the reception resonant coil 310 is transmitted to the reception induction coil 320 due to the electromagnetic induction. The power transferred to the reception induction coil 320 is rectified by the rectifying unit 330 and transferred to the load 400.

A quality factor and a coupling coefficient are important in the wireless power transmission.

The quality factor may refer to an index of energy that may be stored in the vicinity of the wireless power transmitter or the wireless power receiver.

The quality factor may vary according to the operating frequency f as well as a shape, a dimension and a material of a coil. The quality factor may be expressed as following equation, $Q=\omega*L/R$. In the above equation, L refers to the inductance of a coil and R refers to resistance corresponding to the quantity of power loss caused in the coil.

The quality factor may have a value of 0 to infinity.

The coupling coefficient represents the degree of inductive magnetic coupling between a transmission coil and a reception coil, and has a value of 0 to 1.

The coupling coefficient may vary according to the relative position and the distance between the transmission coil and the reception coil.

FIG. 2 is a circuit diagram showing an equivalent circuit of the transmission induction coil 210 according to the embodiment.

As shown in FIG. 2, the transmission induction coil 210 may include an inductor L1 and a capacitor C1, and a circuit having a desirable inductance and a desirable capacitance can be constructed by the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected in parallel to the capacitor C1.

The capacitor C1 may include a variable capacitor, and impedance matching may be performed by adjusting the capacitance of the capacitor C1. The equivalent circuit of the transmission resonant coil 220, the reception resonant coil 310 and the reception induction coil 320 may be the same as the equivalent circuit shown in FIG. 2.

FIG. 3 is a circuit diagram showing an equivalent circuit of the power source 100 and the wireless power transmitter 200 according to one embodiment.

As shown in FIG. 3, the transmission induction coil 210 and the transmission resonant coil 220 may be constructed by using inductors L1 and L2 and capacitors C1 and C2 having predetermined inductances and capacitances, respectively.

FIG. 4 is a circuit diagram showing an equivalent circuit of the wireless power receiver 300 according to one embodiment.

As shown in FIG. 4, the reception resonant coil 310 and the reception induction coil 320 may be constructed by using inductors L3 and L4, and capacitors C3 and C4 having predetermined inductances and capacitances, respectively.

The rectifying unit 330 may include a diode D1 and a rectifying capacitor C5 and may convert AC power into DC power to output the DC power.

The rectifying unit 330 may include a rectifying circuit (not shown) and a smoothing circuit (not shown).

The rectifying circuit performs a rectifying function of converting received AC power into DC power.

According to one embodiment, the rectifying circuit may include at least one diode. According to one embodiment, bridge diodes may be used as the rectifying circuit.

The smoothing circuit may smooth the rectified output.

The smoothing circuit may output the stable DC current by removing a ripple component from the DC power output from the rectifying circuit.

The smoothing circuit 432 may include a capacitor for smoothing.

The load 400 may be a predetermined rechargeable battery or a device requiring DC power. For example, the load 400 may refer to a battery.

The wireless power receiver 300 may be installed in an electronic device, such as a cellular phone, a laptop computer or a mouse, requiring power.

FIG. 5 is a block diagram showing a wireless power receiver 300 according to a second embodiment.

Referring to FIG. 5, the wireless power receiver 300 may include the reception induction coil 320, the rectifying unit 330, the DC-DC converter 350, and a battery management IC (BMIC) 360. According to the embodiment, if the wireless power receiver 300 receives power from the wireless power transmitter 200 through the resonance, the wireless power receiver 300 may further include the reception resonant coil 310. According to the embodiment, if the wireless power receiver 300 receives power from the wireless power transmitter 200 through the electromagnetic induction, the wireless power receiver 300 may not include the reception resonant coil 310.

The reception induction coil 320 receives power from the wireless power transmitter 200. The power received in the reception induction coil 320 may be AC power.

The rectifying unit 330 may convert the AC power received in the reception induction coil 320 into DC power.

The rectifying unit 330 may include a rectifying circuit 331 and a smoothing circuit 332.

The rectifying circuit 331 may include at least one diode. According to the embodiment, the diode may refer to a silicon diode. According to one embodiment, although the rectifying circuit 331 may perform a rectifying function by using one diode, the rectifying circuit 331 may preferably have the structure in which at least one diode is arranged. As shown in FIG. 5, the rectifying circuit 331 may include a bridge diode as one example. The bridge diode structure is a circuit structure in which four diodes are connected to each other to perform a rectifying function.

The rectifying circuit 331 performs a rectifying function of converting received AC power into DC power. According to the embodiment, since the power is proportional to voltage or current, it is assumed that power, voltage, and current have the same concept for the convenience of explanation. The rectifying function refers to a function allowing current to flow only in one direction. In other words, the forward resistance of the rectifying circuit 331 is low, and the reverse resistance of the rectifying circuit 331 is sufficiently great, so that current may flow only in one direction.

The smoothing circuit 332 may output the stable DC current by removing a ripple component from the DC output power of the rectifying circuit 331.

The smoothing circuit 332 may include a capacitor for smoothing.

The DC-DC converter 350 may output DC voltage suitable to operate the BMIC 360 by using the DC voltage output from the smoothing circuit 350. The DC-DC converter 350 may convert the DC voltage output from the smoothing circuit 332 into the AC voltage, and then, may boost up or drop down and rectify the converted AC voltage to output the DC voltage suitable to operate the BMIC 360.

Thus, the DC-DC converter 350 may convert the input voltage into a voltage having a predetermined value and output the converted voltage.

The DC-DC converter 350 may include a switching regulator or a linear regulator.

The linear regulator is a converter to receive input voltage, provide output voltage by a required quantity, and dissipate the remaining voltage as heat.

The switching regulator is a converter to adjust output voltage through a pulse width modulation (PWM) scheme.

The BMIC 360 adjusts the DC power output from the DC-DC converter 350 and provides the adjusted DC power to the load 400. According to an embodiment, the load 400 may include a battery. When the load 400 is a battery, the BMIC 360 may control the DC power output from the DC-DC converter 350 in order to stably supply power to the battery.

The BMIC 360 may be embedded in the load 400.

An amount of current charged in the load 400 may vary with the DC voltage applied to both terminals of the load 400.

The BMIC 360 may control the DC power to provide the controlled DC power to the load such that the load 400 is charged with a constant DC current.

Operational details of the BMIC 360 will be described below.

FIG. 6 is a flowchart illustrating a power control method of a wireless power receiver 300 according to a first embodiment.

Details of the wireless power receiver 300 are equal to those shown in FIG. 5.

It is assumed in the following description that the load 400 is a battery embedded in an electronic appliance such as a portable phone or a laptop computer.

Referring to FIG. 6, first, in step S101, the BMIC 360 determines whether the load 400 operates in a non-charging mode. The non-charging mode may signify that power is not supplied to the load 400. To the contrary, a charging mode may signify that power having a predetermined level or more is continuously supplied to the load 400.

In step S103, if the BMIC 360 confirms that the load 400 is in the non-changing mode, the BMIC 400, the BMIC 360 applies a voltage equal to or higher than a threshold voltage to the load 400. According to an embodiment, the threshold voltage may refer to the minimum voltage required to allow the load 400 to enter the charging mode. According to an embodiment, the threshold voltage, which is the minimum voltage required to allow the load 400 to enter the charging mode, may be 4.2V, but the threshold voltage of 4.2V is only one example.

Thereafter, in step S105, the BMIC 360 applies a voltage equal to or higher than the threshold voltage to the load 400 to allow the load 400 to enter the charging mode.

Then, in step S107, the BMIC 360 determines whether the voltage applied to the load 400 is lower than the threshold voltage.

In step S109, if the voltage applied to the load 400 is lower than the threshold voltage, the BMIC 360 blocks the voltage applied to the load 400 to allow the load 400 to enter the non-charging mode. That is, when the voltage applied to the load 400 is lower than the threshold voltage, the BMIC 360 may determine that it is difficult for the load 400 to normally maintain the charging mode and may block the voltage applied to the load 400.

The voltage applied to the load 400 may become lower than the threshold voltage due to several reasons. For instance, it may be happen when there is no wireless power transmitter 200 transmitting power to the wireless power receiver 300, when the distance between the wireless power transmitter 200 and the wireless power receiver 300 deviates from a power transmission distance, and when the alignment directions of the wireless power transmitter 200 and the wireless power receiver 300 are not matched with each other so that the wireless power receiver 300 cannot normally receive power.

Thereafter, since the BMIC 360 does not supply power to the load 400, the BMIC 360 returns to the step S103 of applying the threshold voltage or higher to the load 400.

Then, after the step S105 is performed, if the voltage applied to the load 400 is lower than the threshold voltage in step S107, the process returns to the step S109 of allowing the load 400 to enter the non-charging mode.

As described above, for the external reason that the voltage applied to the load 400 is lower than the threshold voltage, the load 400 alternates between the charging mode and the non-charging mode, so that the load 400 may unstably operate. When the load 400 alternates between the charging mode and the non-charging mode, so that the load 400 unstably operates, an erroneous operation may occur in the entire wireless power transmission system.

That is, when the load 400 is a battery, due to the erroneous operation caused by the alternate operation of the battery between the charging mode and the non-charging mode, the durability of the battery may be reduced and the charging time for the battery may be increased.

Hereinafter, an embodiment for preventing an unstable operation of the load 400 will be described with reference to FIGS. 7 to 10.

FIG. 7 is a block diagram showing a wireless power receiver 300 according to a third embodiment.

Referring to FIG. 7, the wireless power receiver 300 may include a reception induction coil 320, a rectifying unit 330 and a charging management unit 370.

In addition, although not shown in FIG. 7, the wireless power receiver 300 may further include a DC-DC converter 350 shown in FIG. 5.

In addition, although not shown in FIG. 7, the wireless power receiver 300 may further include a battery management device (BMIC) 360 shown in FIG. 5.

The BMIC 360 may control the DC power in order to charge the load 400 with a constant DC current.

The BMIC 360 may be included in the load 400. Hereinafter, it is assumed in the description that the BMIC 360 is included in the load 400.

According to the embodiment, if the wireless power receiver 300 receives power from the wireless power transmitter 200 through the resonance, the wireless power receiver 300 may further include a reception resonant coil 310. That is, the transmission resonant coil 220 of the wireless power transmitter 200 and the reception resonant coil 310 of the wireless power receiver 300 are magnetically coupled to each other and operate at the resonance frequency. The resonance coupling between the transmission resonant coil 220 of the wireless power transmitter 200 and the reception resonant coil 310 of the wireless power receiver 300 may improve the power transmission efficiency between the wireless power transmitter 200 and the wireless power receiver 300.

According to the embodiment, if the wireless power receiver 300 receives power from the wireless power transmitter 200 through the electromagnetic induction, the wireless power receiver 300 may not include the reception resonant coil 310.

The reception induction coil 320 transfers the AC power received from the wireless power transmitter 200 to the rectifying unit 330.

The rectifying unit 330 may rectify AC power to produce DC power.

The rectifying unit 330 may include a rectifying circuit 331 and a smoothing circuit 332.

The rectifying circuit 331 may include at least one diode. According to the embodiment, the diode may refer to a silicon diode. According to one embodiment, although the rectifying circuit 331 may perform a rectifying function by using one diode, the rectifying circuit 331 may preferably have the structure in which at least one diode is arranged. As shown in FIG. 5, the rectifying circuit 331 may include a bridge diode as one example. The bridge diode structure is a circuit structure in which four diodes are connected to each other to perform a rectifying function.

The rectifying circuit 331 performs a rectifying function of converting received AC power into DC power. According to the embodiment, since the power is proportional to voltage or current, it is assumed that power, voltage, and current have the same concept for the convenience of explanation. The rectifying function refers to a function allowing current to flow only in one direction. In other words, the forward resistance of the rectifying circuit 331 is low, and the reverse resistance of the rectifying circuit 331 is sufficiently great, so that current may flow only in one direction.

The smoothing circuit 332 may output the stable DC current by removing a ripple component from the DC output power of the rectifying circuit 331.

The smoothing circuit 332 may include a capacitor for smoothing.

The charging management unit 370 may measure the DC voltage applied from the rectifying unit 330 to a switch 371 and may determine whether to allow the load to enter the charging mode or the non-charging mode according to the measured DC voltage. The charging management unit 370 may manage whether to charge the load 400 according to the determination result.

The charging management unit 370 may include the switch 371, a control unit 373 and a voltage limiting unit 375.

The control unit 373 may control the entire operation of the charging management unit 370.

Although the control unit 373 may be included in the charging management unit 370, the control unit 373 may be provided as a separated element to control the entire operation of the wireless power receiver 300.

The control unit 373 may measure the DC voltage transferred to the switch 371.

The control unit 373 may confirm whether the DC voltage transferred to the load 400 is equal to or higher than a first threshold voltage and may control the operation of the switch 371 according to the confirmation result. According to an embodiment, the first threshold voltage may refer to the minimum voltage required to allow the load 400 to enter the charging mode. The first threshold voltage may be the DC voltage of 4.2V, but the threshold voltage of 4.2V is only one example.

When the DC voltage transferred to the switch 371 is equal to or higher than the first threshold voltage, a short signal is transferred to the switch 371 such that the switch 371 is switched on. When the switch 371 is switched on, the load 400 may receive a voltage equal to or higher than the first threshold voltage to enter the charging mode.

The charging mode may signify that constant power or greater is continuously supplied to the load 400.

When the load 400 is in the charging mode, the control unit 373 may measure the voltage applied to the switch 371 to confirm whether the measured voltage is equal to or higher than a second threshold voltage.

According to one embodiment, the second threshold voltage may signify a minimum voltage for maintaining the charging mode of the load 400. The second threshold voltage may be equal to or lower than the first threshold voltage. When the voltage applied to the switch 371 is equal to or higher than the second threshold voltage, the control unit 373 may maintain the charging mode and may measure the voltage applied to the switch 371 every a predetermined time.

When the voltage applied to the switch 371 is lower than the second threshold voltage, the control unit 373 may transmit an open signal to allow the switch 371 to be switch off. Thus, the load 400 deviates from the charging mode.

That is, the control unit 373 may confirms every a predetermined time whether the voltage applied to the switch 371 is equal to or higher than the second threshold voltage to stably maintain the load 400 in the charging mode.

When the DC power transferred to the load is equal to or greater than a preset value, the voltage limiting unit 375 may project the load 400 by absorbing the remaining power except for the power corresponding to the preset value. According to an embodiment, the preset value may signify a maximum voltage at which the load 400 is not damaged.

According to an embodiment, the voltage limiting unit 375 may include a zener diode. The zener diode allows current to flow therethrough when the voltage applied to the zener diode is above a certain voltage, and is operated like an open circuit when the voltage applied to the zener diode is below a certain voltage so that current does not flow therethrough.

FIG. 8 is a circuit diagram showing a configuration of the control unit 373 according to one embodiment.

The control unit 373 may include a comparator configured with an amplifier and plural resistors.

The comparator may compare an input voltage V1 with a reference voltage V2 to control the switch 371. The input voltage V1 may be a voltage applied to the load 400.

When a difference between the input voltage V1 and the reference voltage V2 is less than a specific voltage, the control unit 373 may allow the switch 371 to be switched off. The specific voltage may be the second threshold voltage described with reference to FIG. 7.

When the difference between the input voltage V1 and the reference voltage V2 is equal to or greater than the specific voltage, the control unit 373 may allow the switch 371 to be switched on such that the DC voltage output from the rectifying unit 330 is transferred to the load 400, where the specific voltage may be the first threshold voltage described with reference to FIG. 7.

FIG. 9 is a view showing various structures of the switch 371 according to an embodiment.

As shown in FIG. 9, the switch 371 constituting the charging management unit 370 may include various of metal oxide semiconductor field-effect transistors (MOSFETs).

The MOSFETs include channels including P type and N type materials, and are classified into NMOSFETs, PMOSFETs, and CMOSFETs according to the materials.

Each MOSFET includes a gate terminal, a source terminal, and a drain terminal, and may serve as a switch by using the voltage of the gate terminal.

FIG. 10 is a flowchart illustrating a power control method of a wireless power receiver 300 according to a second embodiment.

An operation of the wireless power receiver 300 is essentially equal to that described in FIG. 7. Hereinafter, since the DC power is proportional to the DC voltage, the DC power output from the rectifying unit 330 may be replaced with the DC voltage output from the rectifying unit 330. Likewise, the DC power applied to the switch 371 may be replaced with the DC voltage applied to the switch 371.

In addition, in the below description, the non-charging mode may signify that power is not supplied to the load 400, and a charging mode may signify that power having a predetermined level or more is continuously supplied to the load 400.

First, in step S201, the control unit 373 transmits an open signal to the switch 371 such that the switch 371 is switched off.

Then, in step S203, the control unit 373 stands by for 100 ms. The time of 100 ms is only one example.

Next, in step S205, the control unit 373 measures the voltage applied to the switch 371. The reason that the control unit 373 measures the voltage applied to the switch 371 after the time of 100 ms is elapsed is that the control unit 373 periodically measures the voltage applied to the switch 371 in order to determine whether to allow the switch 371 to be switched off.

Various schemes may be utilized as the scheme of measuring the voltage applied to the switch 371. For example, the control unit 373 may measure the voltage applied to the switch 371 through the comparator described with reference to FIG. 8.

Thereafter, in step S207, the control unit 373 confirms whether the measured DC voltage is equal to or higher than a first threshold voltage. According to an embodiment, the first threshold voltage may refer to the minimum voltage required to allow the load 400 to enter the charging mode. The first threshold voltage may be the DC voltage of 4.2V, but the threshold voltage of 4.2V is only one example.

In step S209, if the measured DC voltage is equal to or higher than the first threshold voltage, the control unit 373 transmits a short signal to the switch 371. When the short signal is transmitted to the switch 371, the load 400 may normally receive the DC power so that the load 400 may enter the charging mode.

In step S211, the control unit 373 allows the power having a voltage equal to or higher than the first threshold voltage to be output to the load, so that the load 400 enters into the charging mode.

If the measured DC voltage is lower than the first threshold voltage in the step S207, the control unit 373 returns to the step S201, so that the control unit 373 transmits an open signal to the switch 371, thereby allowing the switch 371 to be switched off.

In step S213, when the load 400 enters into the charging mode, the control unit 373 measures the voltage applied to the switch 371 again.

Thereafter, in step S215, the control unit 373 confirms whether the measured voltage is equal to or higher than a second threshold voltage. According to an embodiment, the second threshold voltage may refer to the minimum voltage required to allow the load 400 to be maintained in the charging mode. The second threshold voltage is equal to or lower than the first threshold voltage. If it is confirmed in the step S215 that the measured voltage is equal to or higher than a second threshold voltage, the control unit 373 stands by for 100 ms in step S217.

If the time of 100 ms is elapsed, the control unit 373 returns to the step 213 to measure the voltage applied to the switch 371. The reason that the control unit 373 measures the voltage applied to the switch 371 after the time of 100 ms is elapsed is that the control unit 373 periodically measures the voltage applied to the switch 371 in order to confirm whether the load 400 is maintained in the charging mode.

In step S215, if it is confirmed that the measured voltage is lower than the second threshold voltage, the control unit 373 returns to the step S201 to allow the switch 371 to be switched off. That is, when the voltage applied to the load 400 is lower than a voltage required to maintain the charging mode, the control unit 373 allows the switch 371 to be switched off so that the load 400 can be prevented from alternating between the charging mode and the non-charging mode.

Differently from the embodiment of FIG. 6, in addition to set the first threshold voltage for allowing the load 400 to enter the charging mode, the second threshold voltage is further set for maintaining the charging mode. That is, the method of controlling power of the wireless power receiver according to the second embodiment sets the second threshold voltage required to maintain the load 400 in the charging mode, so that the repetition of the charging mode and the discharging mode by the load 400 may be reduced. For this reason, the load 400 is prevented from being erroneously operated, so that the operation of the wireless power transmission system may be stably maintained.

A power control method according to the disclosure may be prepared as a program executable by a computer and stored in computer-readable recording media. The computer-readable recording media include a ROM, a RAM, a CD-ROM, a magnetic table, a floppy disk, and an optical data storing device, and include a device realized in the form of a carrier wave (for example, transmission over the Internet).

The computer-readable recording media are distributed into computer systems connected to each other through a network to store computer-readable codes through a distribution scheme so that the computer-readable codes may be executed. In addition, function programs, codes, and code segments used to realize the method can be easily deduced by programmers in the art to which the disclosure pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of supplying power in a wireless power receiver, the method comprising:
   receiving an AC power via a reception coil in the wireless power receiver;
   rectifying the AC power to a DC power;
   entering a charging mode by transferring the DC power to a load when a voltage of the DC power is equal to or greater than a first threshold voltage;
   maintaining the load in the charging mode when the voltage of the DC power is equal to or greater than a second threshold voltage in a state of the charging mode; and
   blocking the DC power to the load when the voltage of the DC power transitions from a voltage higher than the second threshold voltage to a lower voltage less than the second threshold voltage,
   wherein the first threshold voltage is greater than the second threshold voltage.

2. The method of claim 1, wherein the entering the charging mode includes generating an enable signal to a DC-DC converter to connect the DC-DC converter to the load, and adjusting, via the DC-DC converter, the DC power to the load.

3. The method of claim 2, wherein the blocking the DC power to the load includes generating a disable signal to the DC-DC converter to stop power transmission to the load.

4. The method of claim 1, wherein the first threshold voltage is a minimum voltage required for the load to enter the charging mode, and the second threshold voltage is a minimum voltage required for the load to maintain the charging mode.

5. The method of claim 2, wherein the rectifying the AC power to the DC power is performed by a rectifying unit connected to a DC-DC converter.

6. The method of claim 5, wherein the DC-DC converter is connected between an output of the rectifying unit and an input of the load.

7. The method of claim 5, wherein the entering the charging mode includes turning on the DC-DC converter to allow the transmission of power to the load, and wherein the blocking the DC power to the load includes turning off the DC-DC converter.

8. The method of claim 1, wherein the first threshold voltage is greater than 4 V.

9. The method of claim 1, further comprising:
measuring a voltage of the DC power of a rectifier; and
blocking the DC power to the load when the voltage of the DC power exceeds a maximum voltage.

10. A wireless power receiver comprising:
a reception coil configured to output an AC power;
a rectifier configured to rectify the AC power to a DC power;
a DC-DC converter configured to adjust the DC power and to transfer the adjusted DC power to a load; and
a controller configured to:
measure a voltage of the DC power of the rectifier,
enter a charging mode by transferring the DC power to the load when a voltage of the DC power is equal to or greater than a first threshold voltage,
maintain the load in the charging mode when the voltage of the DC power is equal to or greater than a second threshold voltage in a state of the charging mode,
block the DC power to the load when the voltage of the DC power transitions from a voltage higher than the second threshold voltage to a lower voltage less than the second threshold voltage, and
block the DC power to the load when the voltage of the DC power exceeds a maximum voltage,
wherein the first threshold voltage is greater than the second threshold voltage.

11. The wireless power receiver according to claim 10, wherein the rectifier includes a rectifying circuit connected to the DC-DC converter.

12. The wireless power receiver according to claim 11, wherein the controller is configured to turn on the DC-DC converter to allow the transmission of power to the load, and to turn off the DC-DC converter to block the DC power to the load.

13. The wireless power receiver according to claim 10, wherein the controller is configured to allow the load to enter the charging mode by generating an enable signal to the DC-DC converter to connect the DC-DC converter to the load, and adjusting, via the DC-DC converter, the DC power to the load.

14. The wireless power receiver according to claim 10, wherein the controller is configured to block the adjusted DC power to the load by generating a disable signal to the DC-DC converter to stop power transmission to the load.

15. The wireless power receiver according to claim 10, wherein the first threshold voltage is a minimum voltage required for the load to enter the charging mode, and the second threshold voltage is a minimum voltage required for the load to maintain the charging mode.

16. The wireless power receiver according to claim 10, wherein the DC-DC converter is connected between an output of the rectifier and an input of the load.

17. The wireless power receiver according to claim 10, wherein the first threshold voltage is greater than 4 V.

18. A method of using power in a wireless power receiver, the method comprising:
receiving an AC power by a reception coil in the wireless power receiver;
rectifying, via a rectifying unit in the wireless power receiver, the AC power to a DC power;
when a voltage of rectifying unit exceeds a first threshold voltage, entering into a charging mode and begin transferring, via a DC-DC converter, the DC power from an output of the rectifying unit to a load connected to the wireless power receiver;
maintaining the load in the charging mode and continuing to supply the DC power from the output of the rectifying unit to the load, via the DC-DC converter, while the voltage in the rectifying unit remains greater than or equal to a second threshold voltage that is less than the first threshold voltage; and
when the voltage in the rectifying unit transitions from a voltage higher than the second threshold voltage to a lower voltage that is less than the second threshold voltage, discontinuing the supply of the DC power from the output of the rectifying unit to the load,
wherein the voltage in the rectifying unit is based on a voltage of the reception coil,
wherein the DC-DC converter is connected between the output of the rectifying unit and an input of the load, and
wherein the first threshold voltage is greater than the second threshold voltage.

19. The method of claim 18, wherein the first threshold voltage is a minimum voltage required for the load to enter the charging mode, and the second threshold voltage is a minimum voltage required for the load to maintain the charging mode.

20. The method of claim 18, wherein the first threshold voltage is greater than 4 V.

21. The method of claim 18, further comprising:
measuring a voltage of the DC power of the rectifying unit; and
blocking the DC power to the load when the voltage of the DC power exceeds a maximum voltage.

* * * * *